(12) United States Patent
He et al.

(10) Patent No.: US 11,810,310 B2
(45) Date of Patent: Nov. 7, 2023

(54) SATELLITE IMAGE PROCESSING METHOD, NETWORK TRAINING METHOD, RELATED DEVICES AND ELECTRONIC DEVICE

(71) Applicant: Beijing Baidu Netcom Science and Technology Co., Ltd., Beijing (CN)

(72) Inventors: Dongliang He, Beijing (CN); Henan Zhang, Beijing (CN); Hao Sun, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 277 days.

(21) Appl. No.: 17/335,647

(22) Filed: Jun. 1, 2021

(65) Prior Publication Data

US 2021/0295546 A1 Sep. 23, 2021

(30) Foreign Application Priority Data

Dec. 15, 2020 (CN) .......................... 202011478534.7

(51) Int. Cl.
*G06T 7/55* (2017.01)
*G06N 3/08* (2023.01)
*G06N 3/045* (2023.01)

(52) U.S. Cl.
CPC .............. *G06T 7/55* (2017.01); *G06N 3/045* (2023.01); *G06N 3/08* (2013.01);
(Continued)

(58) Field of Classification Search
CPC ............ G06T 7/55; G06T 2207/10032; G06T 2207/20084; G06T 2207/30181; G06T 2207/20016; G06T 2207/20021; G06T 2207/20081; G06T 5/50; G06T 5/003; G06T 3/4038; G06T 3/4046; G06T 7/11; G06T 5/002; G06T 7/13; G06T 2207/20221; G06N 3/045; G06N 3/08; G06V 10/82; G06V 10/764; G06V 20/176;
(Continued)

(56) References Cited

U.S. PATENT DOCUMENTS 8,170,282 B1 * 5/2012 Roskovensky ......... G06T 7/136
367/118
8,594,375 B1 * 11/2013 Padwick ............... G06T 7/0008
382/103
(Continued)

FOREIGN PATENT DOCUMENTS

| CN | 110880035 A | 3/2020 |
|---|---|---|
| CN | 111091521 A | 5/2020 |
| CN | 111401307 A | 7/2020 |

OTHER PUBLICATIONS

"Image Dehazing Using Residual-Based Deep CNN"; Jinjiang Li, IEEE Access (vol. 6, pp. 26831-26842), 2018 (Year: 2018).*
(Continued)

*Primary Examiner* — Michael S Osinski
(74) *Attorney, Agent, or Firm* — Quinn IP Law

(57) ABSTRACT

The satellite image processing method includes: acquiring a first target satellite image; defogging the first target satellite image through a first neural network to acquire a first satellite image; and adjusting an image quality parameter of the first satellite image through a second neural network to acquire a second satellite image.

12 Claims, 6 Drawing Sheets

(52) U.S. Cl.
CPC ............... *G06T 2207/10032* (2013.01); *G06T 2207/20084* (2013.01); *G06T 2207/30181* (2013.01)

(58) Field of Classification Search
CPC .... G06V 20/13; G06V 10/454; G06V 10/462; G06V 10/751; G06V 20/182; G06V 20/188; G06F 18/214; G06F 18/24; G06F 18/241; G06F 18/2413; G06F 18/28
See application file for complete search history.

(56) References Cited

U.S. PATENT DOCUMENTS

| | | | | |
|---|---|---|---|---|
| 8,655,070 | B1* | 2/2014 | Yang | G06V 20/188 382/209 |
| 9,230,333 | B2* | 1/2016 | Robinson | H04N 19/119 |
| 10,217,236 | B2* | 2/2019 | Kraft | G06F 18/2135 |
| 10,223,816 | B2* | 3/2019 | Dorum | G01C 21/3867 |
| 10,553,020 | B1* | 2/2020 | Hainline | G06T 15/60 |
| 10,775,174 | B2* | 9/2020 | Hofmann | G01C 21/005 |
| 11,080,526 | B2* | 8/2021 | Khandelwal | G06V 20/182 |
| 11,200,639 | B1* | 12/2021 | Kim | G06T 9/002 |
| 11,308,714 | B1* | 4/2022 | Christoudias | G06V 20/176 |
| 11,315,221 | B2* | 4/2022 | Matsuura | G06V 10/454 |
| 11,521,324 | B2* | 12/2022 | Schmidt | G06N 3/08 |
| 11,551,040 | B2* | 1/2023 | Okazaki | G06T 7/0002 |
| 11,557,053 | B2* | 1/2023 | Zhang | G06T 11/60 |
| 2013/0064420 | A1* | 3/2013 | Amin | G06V 20/13 382/103 |
| 2016/0343152 | A1* | 11/2016 | Hay | G06T 11/60 |
| 2017/0061625 | A1* | 3/2017 | Estrada | G06T 7/75 |
| 2017/0147901 | A1* | 5/2017 | Klein | G06V 10/751 |
| 2017/0293800 | A1* | 10/2017 | Babenko | G06V 10/82 |
| 2018/0075581 | A1* | 3/2018 | Shi | G06N 3/045 |
| 2018/0157911 | A1* | 6/2018 | Lo | G06F 18/22 |
| 2018/0357800 | A1* | 12/2018 | Oxholm | G06T 11/001 |
| 2019/0080456 | A1* | 3/2019 | Song | G06T 7/174 |
| 2019/0156476 | A1* | 5/2019 | Yoshida | G06T 7/0012 |
| 2019/0340754 | A1* | 11/2019 | Honkala | A61B 5/7221 |
| 2020/0051217 | A1* | 2/2020 | Shen | G06N 3/045 |
| 2020/0160528 | A1* | 5/2020 | Rhodes | G06T 9/002 |
| 2020/0349682 | A1* | 11/2020 | Mayol Cuevas | G06V 10/776 |
| 2021/0067801 | A1* | 3/2021 | Schroers | G06V 20/46 |
| 2021/0073345 | A1* | 3/2021 | St. Romain, II | G06F 30/20 |
| 2021/0097297 | A1* | 4/2021 | Ren | G06T 5/003 |
| 2021/0158533 | A1* | 5/2021 | Cui | G06T 7/11 |
| 2021/0160466 | A1* | 5/2021 | Gera | G06T 5/009 |
| 2021/0166345 | A1* | 6/2021 | Kim | G06T 3/4053 |
| 2021/0192686 | A1* | 6/2021 | Kim | G06T 1/20 |
| 2021/0385502 | A1* | 12/2021 | Dinh | H04N 19/46 |
| 2021/0407041 | A1* | 12/2021 | Liu | G06T 3/4046 |
| 2022/0058803 | A1* | 2/2022 | Bhattacharya | G06T 5/50 |
| 2022/0075017 | A1* | 3/2022 | Sabuncu | A61B 5/7267 |
| 2022/0152489 | A1* | 5/2022 | Otsuka | A63F 13/67 |
| 2022/0180189 | A1* | 6/2022 | Adrian | G06T 11/00 |
| 2022/0284613 | A1* | 9/2022 | Yin | G06T 7/30 |
| 2022/0413074 | A1* | 12/2022 | Nehrke | G06N 3/084 |
| 2022/0414972 | A1* | 12/2022 | Rohrer | G06T 15/08 |
| 2023/0137031 | A1* | 5/2023 | Tsutsumi | G06T 7/00 382/108 |
| 2023/0206404 | A1* | 6/2023 | Kobayashi | A61B 6/4225 382/100 |
| 2023/0209096 | A1* | 6/2023 | Chen | H04N 19/176 375/240.12 |

OTHER PUBLICATIONS

"Single Image Cloud Removal Using U-Net and Generative Adversarial Networks"; Jiahao Zheng, IEEE Transactions on Geoscience and Remote Sensing (vol. 59, Issue: 8, pp. 6371-6385), 2020 (Year: 2020).*

Li Yufeng et al., "A Coarse-to-Fine Two-Stage Attentive Network for Haze Removal of Remote Sensing Images", Jul. 8, 2020, p. 1-11.

Hui Yang et al., "Image Dehazing using Bilinear Composition Loss Function", arxiv.org, Cornell University Library, 201 Olin Library Cornell University Ithaca, NY 14853, Oct. 1, 2017.

The extended European search report for European application No. EP21177056, dated Jan. 25, 2022.

* cited by examiner

SATELLITE IMAGE PROCESSING METHOD, NETWORK TRAINING METHOD, RELATED DEVICES AND ELECTRONIC DEVICE

CROSS-REFERENCE TO RELATED APPLICATION

This application claims a priority of the Chinese patent application No. 202011478534.7 filed on Dec. 15, 2020, which is incorporated herein by reference in its entirety.

TECHNICAL FIELD

The present disclosure relates to the field of artificial intelligence, in particular to the field of computer vision technology and deep learning technology, more particularly to a satellite image processing method, a network training method, related devices, and an electronic device.

BACKGROUND

Usually, a satellite image is an image of a surface of the earth taken by an imaging system of an earth satellite, and it has important application value in map and navigation products.

Due to influences caused by an atmospheric environment, weather and light environment of the earth, usually there is a problem in the quality of the satellite image, e.g., a part of the satellite image is shielded by fog, or brightness and contrast of the satellite image are not good. Currently, the satellite image is processed in a single dimension, so as to improve the quality of the satellite image.

SUMMARY

An object of the present disclosure is to provide a satellite image processing method, a network training method, related devices, and an electronic device.

In a first aspect, the present disclosure provides in some embodiments a satellite image processing method, including: acquiring a first target satellite image; defogging the first target satellite image through a first neural network to acquire a first satellite image; and adjusting an image quality parameter of the first satellite image through a second neural network to acquire a second satellite image.

In a second aspect, the present disclosure provides in some embodiments a network training method, including: acquiring a training image set, the training image set including a training input satellite image and a training output satellite image corresponding to the training input satellite image, an image parameter of the training input satellite image being different from an image parameter of the training output satellite image, the image parameter including image transparency or an image quality parameter; performing feature extraction on the training input satellite image through a target neural network to acquire a first feature, fusing the first feature with a second feature to acquire a target feature, and performing image reconstruction in accordance with the target feature and the training input satellite image to acquire a second target satellite image, the second feature being a feature acquired through reconstructing a feature extracted from the first feature, the target neural network including a first neural network or a second neural network; determining difference information between the second target satellite image and the training output satellite image; and updating a parameter of the target neural network in accordance with the difference information.

In a third aspect, the present disclosure provides in some embodiments a satellite image processing device, including: a first acquisition module configured to acquire a first target satellite image; a defogging module configured to defog the first target satellite image through a first neural network to acquire a first satellite image; and an image quality parameter adjustment module configured to adjust an image quality parameter of the first satellite image through a second neural network to acquire a second satellite image.

In a fourth aspect, the present disclosure provides in some embodiments a network training device, including: a second acquisition module configured to acquire a training image set, the training image set including a training input satellite image and a training output satellite image corresponding to the training input satellite image, an image parameter of the training input satellite image being different from an image parameter of the training output satellite image, the image parameter including image transparency or an image quality parameter; a feature extraction module configured to perform feature extraction on the training input satellite image through a target neural network to acquire a first feature, fuse the first feature with a second feature to acquire a target feature, and perform image reconstruction in accordance with the target feature and the training input satellite image to acquire a second target satellite image, the second feature being a feature acquired through reconstructing a feature extracted from the first feature, the target neural network including a first neural network or a second neural network; a determination module configured to determine difference information between the second target satellite image and the training output satellite image; and an updating module configured to update a parameter of the target neural network in accordance with the difference information.

In a fifth aspect, the present disclosure provides in some embodiments an electronic device, including at least one processor and a memory in communication with the at least one processor. The memory is configured to store therein an instruction executed by the at least one processor, and the at least one processor is configured to execute the instruction so as to implement the method in the first aspect or the second aspect.

In a sixth aspect, the present disclosure provides in some embodiments a non-transient computer-readable storage medium storing therein a computer instruction. The computer instruction is executed by a computer so as to implement the method in the first aspect or the second aspect.

In a seventh aspect, the present disclosure provides in some embodiments a computer program product. The computer program product is operated on an electronic device so as to implement the method in the first aspect or the second aspect.

BRIEF DESCRIPTION OF THE DRAWINGS

The following drawings are provided to facilitate the understanding of the present disclosure, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

First Embodiment

Figure 1:
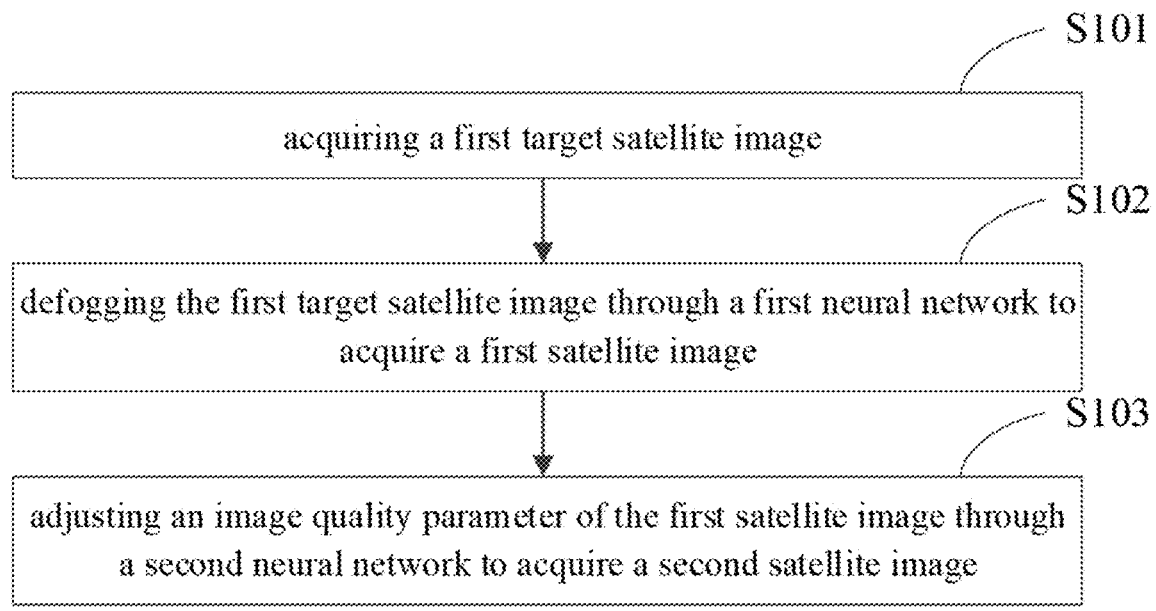
FIG. 1 is a flow chart of a satellite image processing method according to a first embodiment of the present disclosure.

As shown in FIG. 1, the present disclosure provides in this embodiment a satellite image processing method, which includes the following steps.

Step S101: acquiring a first target satellite image.

In this embodiment of the present disclosure, the satellite image processing method relates to the field artificial intelligence, e.g., computer vision and deep learning, and it may be widely applied to various scenarios such as map and navigation. The satellite image processing method may be applied to an electronic device, and the electronic device may be a server or a terminal, which will not be particularly defined herein.

The satellite image refers to an image of a surface of the earth taken by an imaging system of an earth satellite. The imaging system of the earth satellite may take images of parts of the surface of the earth, so as to acquire a plurality of satellite images of the surface of the earth at different positions.

The surface of the earth is consecutive, and a part of contents in different images may be the same. For example, when a village and a river are adjacent to each other on the surface of the earth and an image of the village is taken, an image of the river may probably be taken, and when the image of the river is taken, the image of the village may probably be taken too. Correspondingly, in different satellite images, contents in the images may overlap each other, with a same size or different sizes.

The satellite image taken by the imaging system of the earth satellite may be split into a plurality of satellite images according to the practical need, and an edge of one of the satellite images may overlap an edge of another adjacent one of the satellite images.

In this embodiment of the present disclosure, the word "overlap" may refer to that a same image content occurs at the edges of different satellite images, or the edges of different satellite images may be concatenated to form a complete image representing a corresponding position at the surface of the earth.

Figure 2:
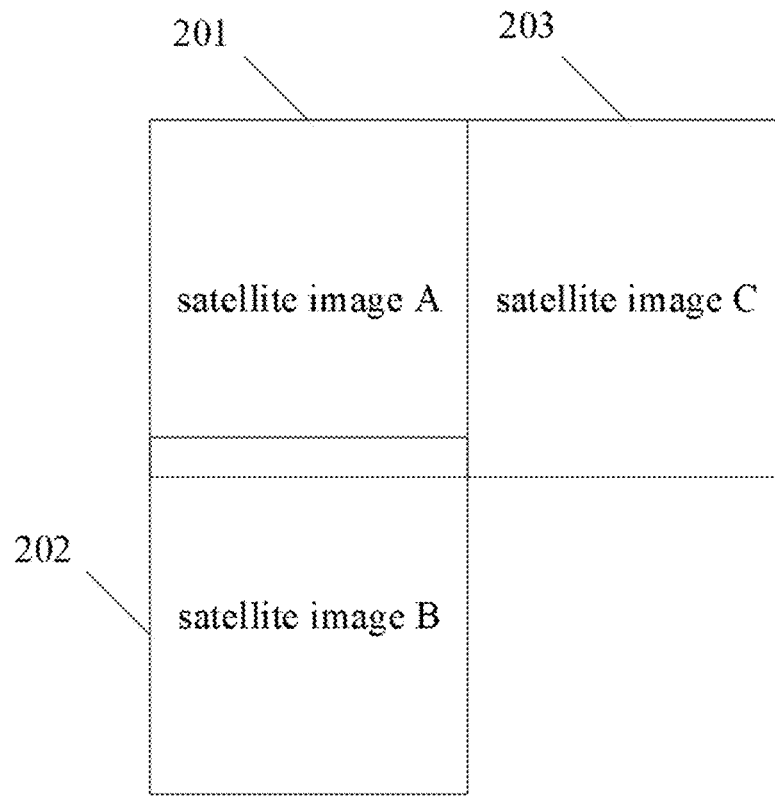
FIG. 2 is a schematic view showing the overlapping of different satellite images.

As shown in FIG. 2 which shows the overlapping of different satellite images, a solid box 201 represents a satellite image A, a solid box 202 represents a satellite image B, and a solid box 203 represents a satellite image C. Content in the solid box 201 represents a content of the satellite image A, a content in the solid box 202 represents a content of the satellite image B, and a content in the solid box 203 represents a content of the satellite image C.

As shown in FIG. 2, the solid box 201 may overlap the solid box 202, i.e., a same image content may occur at a lower edge of the satellite image A and an upper edge of the satellite image B. The satellite A and the satellite image C adjacent to its right edge may be concatenated into a complete image representing a corresponding position at the surface of the earth.

The first target satellite image may merely include a satellite image taken by the imaging system of the satellite earth, or merely include a satellite image acquired through slicing the satellite image taken by the imaging system of the satellite earth, or the first target satellite image may be formed through concatenating a plurality of satellite images whose edges overlap each other, which will not be particularly defined herein.

The first target satellite image may be acquired in various modes. For example, when the first target satellite image merely includes one satellite image, any satellite image may be acquired from an image library as the first target satellite image, and a plurality of satellite images may be pre-stored in the image library. In addition, a satellite image may be received from the imaging system of the earth satellite as the first target satellite image, or a satellite image may be acquired from a network as the first target satellite image, or a satellite image may be acquired from the other device as the first target satellite image.

For another example, when the first target satellite image is formed through concatenating a plurality of satellite images whose edges overlap each other and it includes a to-be-processed satellite image, the to-be-processed satellite image may be just a satellite image whose quality needs to be enhanced.

At this time, the to-be-processed satellite image may be acquired at first, then at least one satellite image capable of being concatenated with the to-be-processed satellite image may be acquired in accordance with the to-be-processed satellite image, and then the to-be-processed satellite image and the other satellite image may be concatenated to acquire the first target satellite image. The to-be-processed satellite image may be a satellite image which needs to be processed.

The satellite images whose content overlaps the content of the to-be-processed satellite image may be recognized through an image recognition technology, and these satellite images may be just satellite images capable of being concatenated with the to-be-processed satellite image.

In addition, the satellite image concatenated with the to-be-processed satellite image may also be recognized in accordance with a serial number of the to-be-processed satellite image. When the satellite image is split into a plurality of satellite images, the plurality of satellite images may be numbered, so as to mark a position of each satellite image in a complete satellite image. For example, a satellite image with a serial number "1" may be a satellite image at an upper left corner of the complete satellite image. Correspondingly, satellite images whose serial numbers are adjacent to the serial number of the to-be-processed image may be acquired, and these satellite images may be just the satellite images capable of being concatenated with the to-be-processed satellite image. For example, when a serial number of the to-be-processed satellite image is "5", a satellite image with a serial number "4" may be located on the left of, and adjacent to, the to-be-processed image and thus it may be concatenated with the to-be-processed satellite image, and a satellite image with a serial number "6" may be located on the right of, and adjacent to, the to-be-processed image and thus it may be concatenated with the to-be-processed satellite image.

In addition, the satellite image concatenated with the to-be-processed satellite image may also be recognized in accordance with position coordinates of the to-be-processed satellite image. Usually, each satellite image may have a plurality of position coordinates, e.g., latitude and longitude, which represents that a surface of the earth is taken at a position corresponding to the position coordinates. When two satellite images have same position coordinates, it may be determined that there is a same image content in the two satellite images. At this time, satellite images having the position coordinates of the to-be-processed image may be acquired from the image library in accordance with the position coordinates of the to-be-processed satellite image, and these satellite images may be just the satellite images capable of being concatenated with the to-be-processed satellite image.

Step S102: defogging the first target satellite image through a first neural network to acquire a first satellite image.

Figure 3:
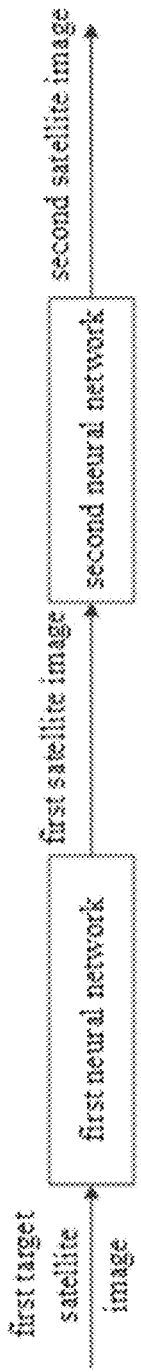
FIG. 3 is a schematic view showing the satellite image processing method implemented through neural networks.

As shown FIG. 3 which is a schematic view showing the implementation of the satellite image processing method through a neural network, the first target satellite image may be processed at two stages. At a first stage, the first target satellite image may be defogged through the first neural network to acquire the first satellite image.

Figure 4:
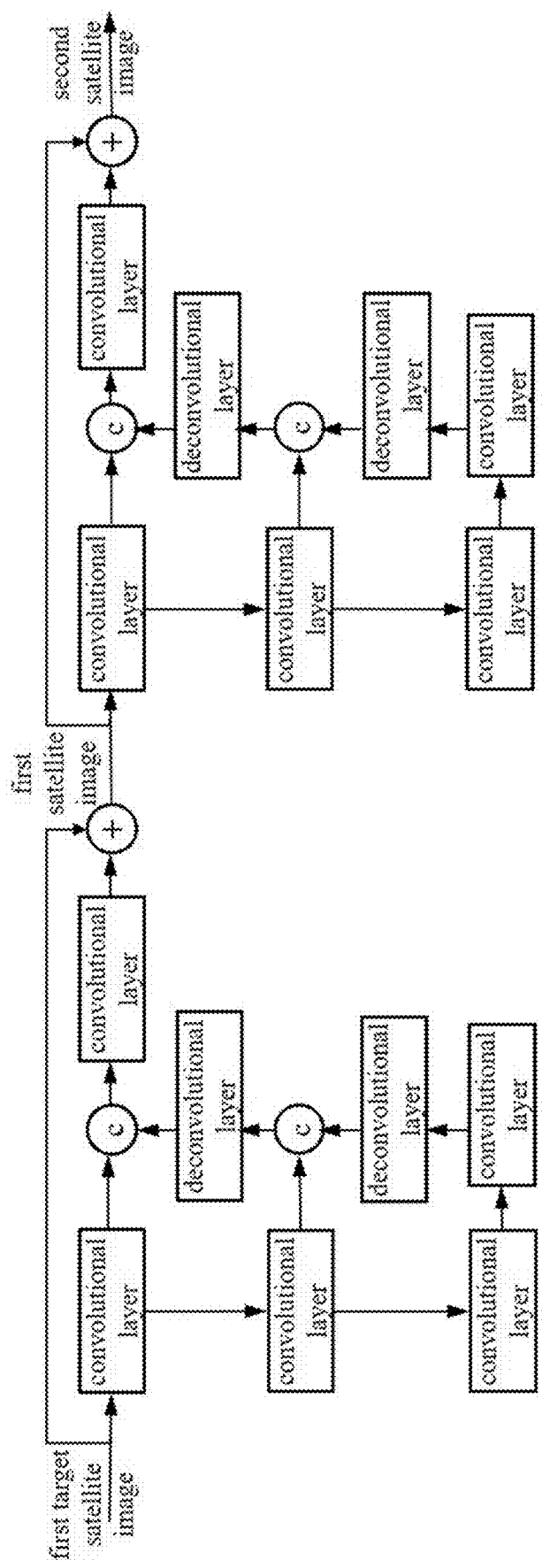
FIG. 4 is a schematic view showing the satellite image processing method implemented through a U-shaped neural network.

The first neural network may be a convolutional neural network, e.g., a U-shaped neural network. As shown in FIG. 4, which is a schematic view showing the implementation of the satellite image processing method through the U-shaped neural network, the U-shaped neural network has a U-shaped encoder-decoder structure, and it includes a plurality of encoders and decoders.

In the U-shaped encoder-decoder structure, a training input satellite image may be added onto an output pixel by pixel through a residual connection (e.g., + in FIG. 4). Convolutional layers and deconvolutional layers may take charge of residual learning, until a residual between an output image and a training output satellite image is minimum. At this time, the training through the first neural network has been completed.

In order to defog the first target satellite image through the first neural network, during the training, the training input satellite image for the first neural network is usually a fogged satellite image while the training output satellite image is a defogged satellite image, i.e., transparency of the output image is usually higher than that of the input image, so as to defog the input image through the first neural network.

To be specific, feature extraction may be performed on the first target satellite image through the first neural network to acquire a first target feature, and then image reconstruction may be performed in accordance with the first target feature and the first target satellite image to acquire the first satellite image. A residual connection may be performed, by a residual connection module, on a feature map representing the first target feature and the first target satellite image to acquire the first satellite image.

In order to perform the feature extraction on the first target satellite image in a better manner, the feature extraction may be performed through a plurality of convolutional layers sequentially in a downsampling mode to acquire multiple layers of features of the first target satellite image. Along with the deepening of the network, a feature outputted by a current convolutional layer may be called as a deep-layer feature relative to a feature outputted by a previous convolutional layer.

The feature reconstruction may be performed on the deep-layer feature at the deconvolutional layer in an upsampling manner, and then information fusion may be performed on the reconstructed feature and a shallow-layer feature in the previous layer. The features may be concatenated sequentially to finally acquire the first target feature.

A direct link may be provided between the encoder and the decoder, so as to introduce the shallow-layer feature from the encoder into the decoder through a concatenating operation (e.g., c in FIG. 4) for the information fusion.

Step S103: adjusting an image quality parameter of the first satellite image through a second neural network to acquire a second satellite image.

As shown in FIG. 3, at a second stage of the two stages for processing the first target satellite image, the image quality parameter of the first satellite image outputted by the first neural network may be intelligently adjusted through the second neural network to acquire the second satellite image.

The second neural network may also be a convolutional neural network, e.g., a U-shaped neural network. As shown in FIG. 4, the entire framework includes two U-shaped neural networks.

The image quality parameter may refer to a visual parameter representing image quality of the image, e.g., color saturation, contrast or brightness.

In order to intelligently adjust the image quality parameter of the first satellite image through the second neural network, during the training, a training output satellite image of the second neural network is usually a satellite image acquired through adjusting an image quality parameter of a training input satellite image (e.g., color saturation, contrast or brightness), so as to intelligently adjust an image quality parameter of an input image of the second neural network.

To be specific, feature extraction may be performed on the first satellite image through the second neural network to acquire a second target feature, and then image reconstruction may be performed in accordance with the second target feature and the first satellite image to acquire the second satellite image. A residual connection may be performed, by the residual connection module, on a feature map representing the second target feature and the first satellite image to acquire the second satellite image.

In order to perform the feature extraction on the first satellite image in a better manner, the feature extraction may be performed through a plurality of convolutional layers sequentially in a downsampling mode to acquire multiple layers of features of the first satellite image. Along with the deepening of the network, a feature outputted by a current convolutional layer may be called as a deep-layer feature relative to a feature outputted by a previous convolutional layer.

The feature reconstruction may be performed on the deep-layer feature at the deconvolutional layer in an upsampling manner, and then information fusion may be performed on the reconstructed feature and a shallow-layer feature in the previous layer. The features may be concatenated sequentially to finally acquire the second target feature.

In this embodiment of the present disclosure, the first target satellite image may be processed through the neural networks at two stages. The satellite image may be defogged through the first neural network at the first stage to acquire the first satellite image, and the image quality parameter of the first satellite image may be adjusted adaptively through the second neural network at the second stage. As compared with the enhancement of the image quality in a single dimension, it is able to improve the quality enhancement effect of the satellite image.

In addition, through adjusting the image quality parameter of the first satellite image through the second neural network, it is able to, when the image quality parameter is adjusted using an image quality parameter adjustment algorithm such as a color enhancement algorithm, prevent the occurrence of such a defect that it is very difficult for a same group of image quality parameters to ensure a smooth transition at a joint between two adjacent satellite images after the quality enhancement. Furthermore, when the image quality parameter of the first satellite image is adjusted through the second neural network, on one hand, it is able to adaptively adjust the image quality parameter and thereby it is unnecessary to perform additional adjustment on the image quality, and on the other hand, it is able to provide the neural network with a lightweight structure and perform the quality enhancement rapidly through an inference acceleration library in the neural network.

In a possible embodiment of the present disclosure, Step S101 may specifically include concatenating the to-be-processed satellite image to at least one to-be-expanded satellite image to acquire the first target satellite image, and the at least one to-be-expanded satellite image may be at least one satellite image overlapping an edge of the to-be-processed satellite image. Subsequent to Step S103, the satellite image processing method may further include cropping a satellite image including a target region from the second satellite image to acquire a third satellite image corresponding to the target region, and the target region may be a region corresponding to the to-be-processed satellite image.

Figure 5:
FIG. 5 is a schematic view showing the blocking artifact display after concatenating two satellite images.

A satellite image taken by the imaging system of the earth satellite may also be split into a plurality of satellite images according to the practical needs. After the quality enhancement on each satellite image, when it is necessary to concatenate the satellite images, inconsistency may easily occur at an edge of the satellite image after the concatenation, resulting in an obvious blocking effect. However, due to the unsmooth transition at the joint, a visual experience may be adversely affected, as shown in FIG. 5.

This is because, when the satellite images are processed through the neural network, different image contents may be perceived by the neural network at edges of the satellite images. Hence, there is an offset when processing different satellite images, and there is an offset for the image quality parameter of the outputted satellite image, thereby the blocking effect may occur at the edge of the satellite image.

During the implementation, the to-be-processed satellite image may be concatenated to at least one to-be-expanded satellite image to acquire the first target satellite image, and the first target satellite image may be an expanded input image of the to-be-processed satellite image.

The to-be-expanded satellite image may be a satellite image overlapping the edge of the to-be-processed satellite image. Satellite images whose contents overlapping the to-be-processed satellite image may be recognized through an image recognition technology, and these satellite images may be just the to-be-expanded satellite images.

In addition, the to-be-expanded satellite image may also be recognized in accordance with a serial number of the to-be-processed satellite image. When the satellite image is split into a plurality of satellite images, the plurality of satellite images may be numbered, so as to mark a position of each satellite image in a complete satellite image. For example, a satellite image with a serial number "1" may be a satellite image at an upper left corner of the complete satellite image. Correspondingly, satellite images whose serial numbers are adjacent to the serial number of the to-be-processed image may be acquired, and these satellite images may be just the satellite images capable of being concatenated with the to-be-processed satellite image. For example, when a serial number of the to-be-processed satellite image is "5", a satellite image with a serial number "4" may be located on the left of, and adjacent to, the to-be-processed image and thus it may be concatenated with the to-be-processed satellite image, and a satellite image with a serial number "6" may be located on the right of, and adjacent to, the to-be-processed image and thus it may be concatenated with the to-be-processed satellite image.

In addition, the to-be-expanded satellite image may also be recognized in accordance with position coordinates of the to-be-processed satellite image. Usually, each satellite image may have a plurality of position coordinates, e.g., latitude and longitude, which represents that a surface of the earth is taken at a position corresponding to the position coordinates. When two satellite images have same position coordinates, it may be determined that there is a same image content in the two satellite images. At this time, satellite images having the position coordinates of the to-be-processed image may be acquired from the image library in accordance with the position coordinates of the to-be-processed satellite image, and these satellite images may be just the to-be-expanded satellite images.

The quantity of the to-be-expanded satellite images may be set according to the practical needs, e.g., 1, 2, 3 or 4. In the case that the quantity of the to-be-expanded satellite images is 1, the to-be-expanded satellite image may be expanded to one edge of the to-be-processed image according to the practical needs, e.g., in an upward, downward, leftward or rightward direction. Taking a downward direction as an example, when the to-be-expanded satellite image overlaps a lower edge of the to-be-processed satellite image, the to-be-expanded satellite image may be concatenated to the lower edge of the to-be-processed satellite image.

In the case that the quantity of the to-be-expanded satellite images is 2, the to-be-expanded satellite images may be expanded to two edges of the to-be-processed image according to the practical needs. For example, when the two to-be-expanded satellite images overlap a right edge and a lower edge of the to-be-processed satellite image respectively, the two to-be-expanded satellite images may be concatenated to the right edge and the lower edge of the to-be-processed satellite image respectively.

In the case that the quantity of the to-be-expanded satellite images is 3, the to-be-expanded satellite images may be expanded to three edges of the to-be-processed image according to the practical needs. For example, when the three to-be-expanded satellite images overlap a right edge, an upper edge and a lower edge of the to-be-processed satellite image respectively, the three to-be-expanded satellite images may be concatenated to the right edge, the upper edge and the lower edge of the to-be-processed satellite image respectively.

Figure 6:
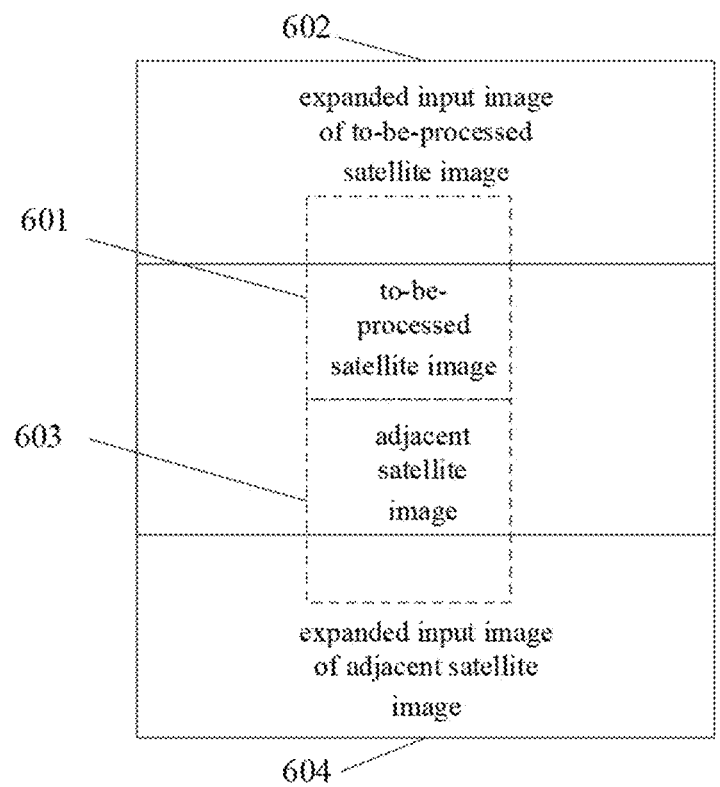
FIG. 6 is a schematic view showing the expansion of a to-be-processed satellite image and an adjacent satellite image.

In the case that the quantity of the to-be-expanded satellite images is 4, the four to-be-expanded satellite images may be expanded to the to-be-processed image from left, right, above and below to form an expanded input image. As shown in FIG. 6, a dotted box 601 represents the to-be-processed satellite image, and the to-be-processed satellite image may be concatenated to the to-be-expanded satellite images surrounding the to-be-processed satellite image to form an expanded input image indicated by a solid box 602.

The expanded input image may be inputted to the neural network for quality enhancement. Then, an image content about a corresponding region of the to-be-processed satellite image may be cropped from the second satellite image, to acquire the third satellite image acquired after the quality enhancement on the to-be-processed satellite image.

A satellite image adjacent to the to-be-processed satellite image, indicated by a dotted box 603 in FIG. 6, may also be concatenated to image regions surrounding the satellite image to form another expanded input image indicated by a solid box 604. Then, the expanded input image may also be inputted to the neural network for quality enhancement.

Figure 7:
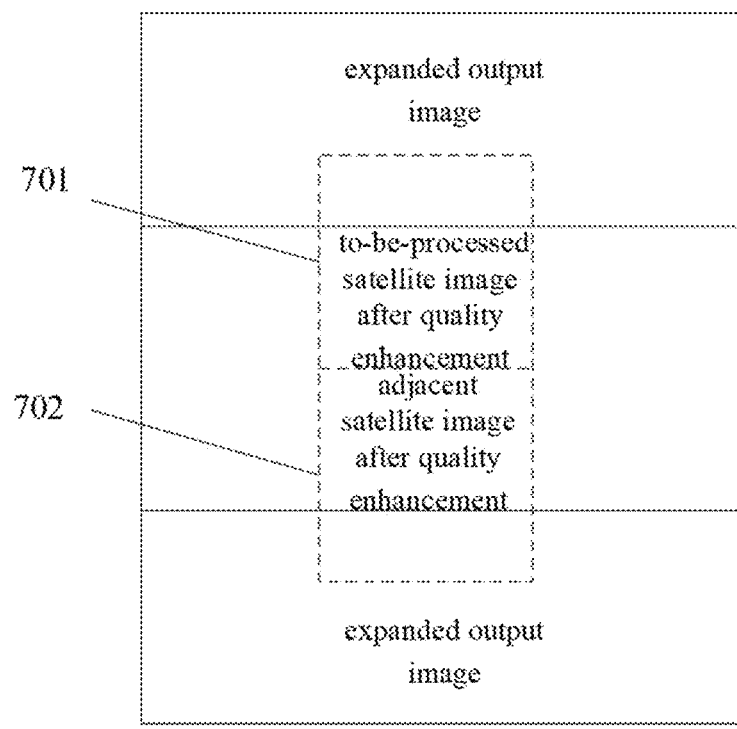
FIG. 7 is a schematic view showing the output of an expanded to-be-processed satellite image and an adjacent satellite image after quality enhancement.

In this regard, for the to-be-processed satellite image and the adjacent satellite image, each of the satellite image indicated by the solid box 602 and the satellite image indicated by the solid box 604 includes the image content of the to-be-processed image and the adjacent satellite image, so when the to-be-processed image and the adjacent satellite image are processed through the neural network separately, peripheral information about the satellite images has been perceived by the neural network, and thereby the outputted satellite images have consistent image quality parameters. As shown in FIG. 7, a dotted box 701 represents a satellite image acquired after the quality enhancement on the to-be-processed satellite image, and a dotted box 702 represents a satellite image acquired after the quality enhancement on the adjacent satellite image. After the quality enhancement, smooth transition may occur at edges of the two satellite images, so as to prevent the occurrence of the blocking effect.

Second Embodiment

Figure 8:
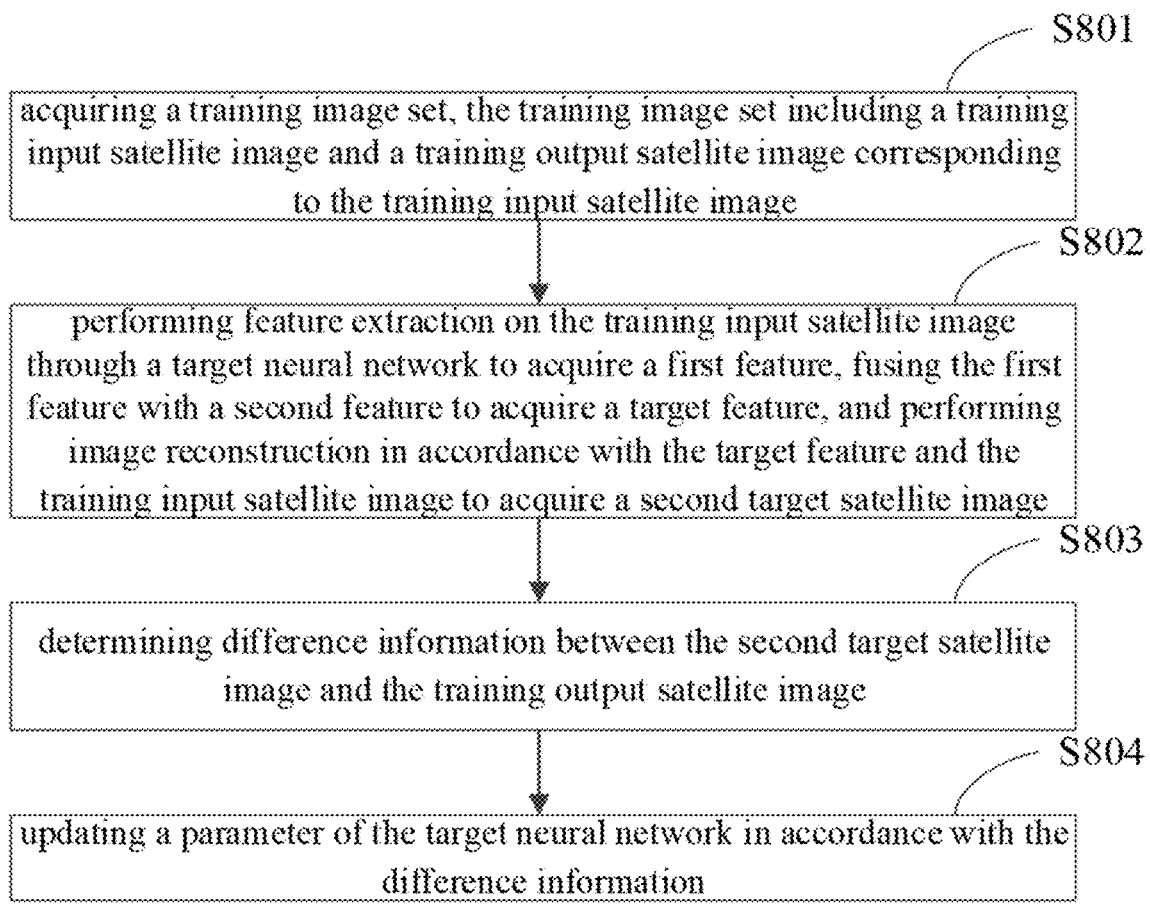
FIG. 8 is a flow chart of a network training method according to a second embodiment of the present disclosure.

As shown in FIG. 8, the present disclosure provides in this embodiment a network training method, which includes: Step S801 of acquiring a training image set, the training image set including a training input satellite image and a training output satellite image corresponding to the training input satellite image, an image parameter of the training input satellite image being different from an image parameter of the training output satellite image, the image parameter including image transparency or an image quality parameter; Step S802 of performing feature extraction on the training input satellite image through a target neural network to acquire a first feature, fusing the first feature with a second feature to acquire a target feature, and performing image reconstruction in accordance with the target feature and the training input satellite image to acquire a second target satellite image, the second feature being a feature acquired through reconstructing a feature extracted from the first feature, the target neural network including a first neural network or a second neural network; Step S803 of determining difference information between the second target satellite image and the training output satellite image; and Step S804 of updating a parameter of the target neural network in accordance with the difference information.

In this embodiment of the present disclosure, the network training method may be used to train not only the first neural network but also the second neural network.

When training the first neural network, the training image set may be called as a first training image set, and when training the second neural network, the training image set may be called as a second training image set.

Due to different functions of the first neural network and the second neural network, the first training image set may be different from the second training image set.

The first neural network may be used to defog the satellite image. Correspondingly, the training input satellite image in the first training image set may include a fogged satellite image, the training output satellite image may include a defogged satellite image, and transparency of the defogged satellite image may be greater than that of the fogged satellite image.

The second neural network may be used to adjust the image quality parameter of the satellite image. Correspondingly, in the second training image set, as compared with the training input satellite image, the training output satellite image may be a satellite image whose image quality parameter has been adjusted.

The first neural network and the second neural network may use a supervised training method and may be trained separately. With respect to the first neural network, the first training image set may be represented by three sets as expressed by the following equation:

$$D_1 = \{(x_i, y_i)\}_{i=1}^N \quad (1),$$

where N represents the quantity of first raining satellite image pairs, each first training satellite image pair includes a first training input satellite image and a first training output satellite image, $x_i$ represents the first training input satellite image which is a fogged satellite image, $y_i$ represents the first training output satellite image which is a defogged satellite image, and $D_1$ represents the first training image set consisting of N first training satellite image pairs.

When training the first neural network, it is required to minimize a loss function between $y_i$ and an output $F_1(x_i)$ of the first neural network. The first neural network may be trained through minimizing the loss function.

With respect to the second neural network, the second training image set may also be represented by three sets as expressed by the following equation:

$$D_2 = \{(y_j', z_j)\}_{j=1}^M \quad (2),$$

where M represents the quantity of second training satellite image pairs, each second training satellite image pair includes a second training input satellite image and a second training output satellite image, $y_j'$ represents the second training input satellite image which is a satellite image outputted by the first neural network, $z_j$ represents the second training output satellite image which is a satellite image acquired through adjusting the image quality parameter of the second training input satellite image, and $D_2$ represents the second training image set consisting of M second training satellite image pairs.

When training the second neural network, it is required to minimize a loss function between $z_j$ and an output $F_2(y_j')$ of the first neural network. The second neural network may be trained through minimizing the loss function.

The above-mentioned loss function may use a commonly-used loss calculation mode, which may include, but not limited to, an L2 norm or an L1 norm between two satellite images.

The first training image set may be acquired in various modes. For example, pairs of satellite images may be taken in different weather conditions, e.g., on a foggy day and a fogless day, as the first training image set. For another example, a fogless satellite image may be acquired, and then a fogged satellite image pairing with the fogless satellite image may be formed through fogging.

The second training image set may also be acquired in various modes. For example, pairs of satellite images may be taken in different light environments as the second training image set. For example, pairs of satellite images may be taken in a strong light environment and a weak light environment as the second training image set. For another example, a second training input satellite image may be acquired, and then an appropriate parameter of the second training input satellite image may be adjusted through an automatic color enhancement algorithm to improve a visual effect of the second training input satellite image, thereby to acquire a second training output satellite image pairing with the second training input satellite image.

A training procedure of the first neural network may be the same as that of the second neural network, and the neural network may be called as the target neural network, i.e., the neural network may be the first neural network or the second neural network.

When training the target neural network, the feature extraction may be performed sequentially on the satellite image in a downsampling mode through a plurality of convolutional layers in the target neural network, to acquire a first feature and a second feature. The first feature may be a shallow-layer feature, and the second feature may be a deep-layer feature. The deep-layer feature may be reconstructed in an upsampling mode through a deconvolutional layer, and then information fusion may be performed on the reconstructed feature and the shallow-layer feature from a previous layer to acquire a target feature.

It should be appreciated that, in the case of more convolutional layers, the feature extraction may also be performed on the second feature to acquire a deeper-layer feature. The deeper-layer feature may be reconstructed in an upsampling mode through the deconvolutional layer, then the information fusion may be performed on the reconstructed feature and the shallow-layer feature from the previous layer, and then the features may be concatenated to acquire the final target feature.

Next, the target feature may be connected to the training input satellite image through a residual connection to perform the image reconstruction, thereby to acquire the second target satellite image. The second target satellite image may be just an output of the target neural network.

In the case that the target neural network is the first neural network, the second target satellite image may be compared with the first training output satellite image to acquire first difference information. In the case that the target neural network is the second neural network, the second target satellite image may be compared with the second training output satellite image to acquire second difference information. The difference information between the second target satellite image and the first training output satellite image or between the second target satellite image and the second training output satellite image may be determined through a commonly-used loss calculation mode.

Next, the parameter of the target neural network may be updated in accordance with the difference information, and in the case that the difference information is minimized, i.e., the loss function is minimized, the training of the target neural network has been completed.

In this embodiment of the present disclosure, the feature extraction may be performed on the training input satellite image, and then the second target satellite image may be acquired through image reconstruction. In addition, the second target satellite image may be compared with the training output satellite image whose image parameter is different from the training input satellite image, so as to update the parameter of the first neural network or the second neural network. In this regard, it is able to train the first neural network or the second neural network, thereby to enable the first neural network to performing a defogging operation and enable the second neural network to adjust the image quality parameter.

In a possible embodiment of the present disclosure, the target neural network may include the first neural network. Step S801 may specifically include: acquiring the training output satellite image; and performing a fogging operation on the training output satellite image to generate the training input satellite image. Transparency of the training input satellite image may be smaller than transparency of the training output satellite image.

Generally, for a real fogged satellite image, a defogged satellite image pairing with the fogged satellite image in an image library is provided with no true annotation, so it is very difficult to directly acquire a pair of satellite images from the satellite images. In this embodiment of the present disclosure, the first training image set may be acquired through data construction.

To be specific, a fogless satellite image, e.g., a satellite image whose transparency is greater than predetermined threshold, may be acquired from the image library as a training output satellite image $y_i$. The fogging operation may be performed through randomly generating a fogged image $f_i$ to acquire a fogged satellite image pairing with the training output satellite image $y_i$ as a training input satellite image $x_i$ expressed through the following equation:

$$x_i = a*y_i + (1-a)*f_i \qquad (3).$$

In the equation (3), a is a coefficient for determining transparency of fog, i.e., determining the image transparency. When generating the training input satellite image, a may be randomly selected within [0, 0.3]. One first training image set may be acquired through data construction.

In this embodiment of the present disclosure, the first training image set may be acquired through the fogging operation, so it is able to overcome the difficulty in acquiring a pair of a foggy satellite image and a fogless satellite image from the image library, thereby to improve the training accuracy of the first neural network.

In a possible embodiment of the present disclosure, the target neural network may include the second neural network. Step S801 may specifically include: acquiring the training input satellite image, the training input satellite image being a satellite image outputted by the first neural network, the first neural network being used to performing the defogging operation on the inputted satellite image; and adjusting the image quality parameter of the training input satellite image to generate the training output satellite image.

In this embodiment of the present disclosure, like the first training image set, generally there is no true annotation of a satellite image whose image parameter has been adjusted in the image library, so it is very difficult to directly acquire a pair of satellite images from the satellite images. In this embodiment of the present disclosure, the second training image set may be acquired through data construction.

To be specific, the defogging operation may be performed on a satellite image in the image library through the first neural network to acquire an outputted satellite image $x_j'y_j'=F_1(x_j')$, and the outputted satellite image may be just the second training input satellite image.

Color enhancement may be performed on the second training input satellite image through adjusting an appropriate parameter using an existing or new image quality parameter adjustment algorithm such as an automatic color enhancement algorithm, so as to improve the visual quality and acquire a satellite image whose image quality parameter has been adjusted. This satellite image may be just the second training output satellite image. The second training image set may be acquired through the data construction.

In this embodiment of the present disclosure, the output of the first neural network may serve as the second training input satellite image, and the image quality parameter of the second training input satellite image may be adjusted through an existing or new image quality adjustment algorithm to construct the second training output satellite image, thereby to acquire the second training image set. As a result, it is able to overcome the difficulty in acquiring a pair of satellite images before and after the adjustment of the image quality parameter, thereby to improve the training accuracy of the second neural network.

Third Embodiment

Figure 9:
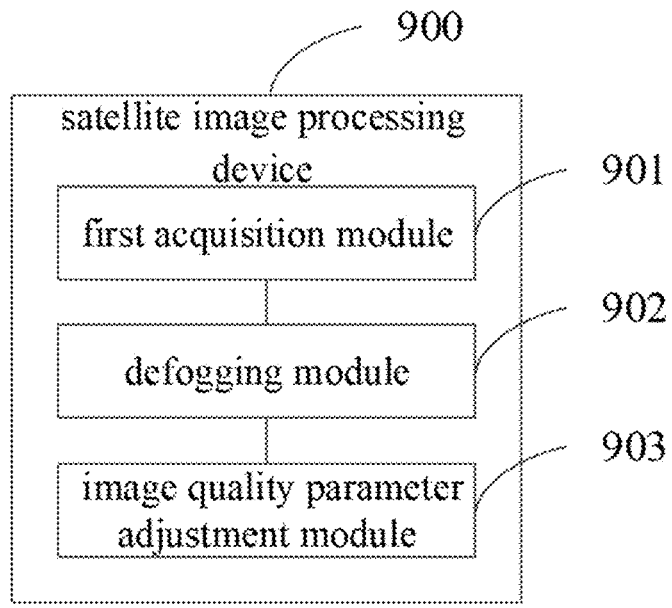
FIG. 9 is a schematic view showing a satellite image processing device according to a third embodiment of the present disclosure.

As shown in FIG. 9, the present disclosure provides in this embodiment a satellite image processing device 900, which includes: a first acquisition module 901 configured to acquire a first target satellite image; a defogging module 902 configured to defog the first target satellite image through a first neural network to acquire a first satellite image; and an image quality parameter adjustment module 903 configured to adjust an image quality parameter of the first satellite image through a second neural network to acquire a second satellite image.

In a possible embodiment of the present disclosure, the first acquisition module 901 is specifically configured to concatenate a to-be-processed satellite image to at least one to-be-expanded satellite image to acquire the first target satellite image, and the at least one to-be-expanded satellite image may be at least one satellite image overlapping an edge of the to-be-processed satellite image. The satellite image processing device may further include a cropping module configured to crop a satellite image including a target region from the second satellite image to acquire a third satellite image corresponding to the target region, and the target region may be a region corresponding to the to-be-processed satellite image.

In this embodiment of the present disclosure, the satellite image processing device 900 may be used to implement the steps of the above-mentioned satellite image processing method with a same beneficial effect, which will not be particularly defined herein.

Fourth Embodiment

Figure 10:
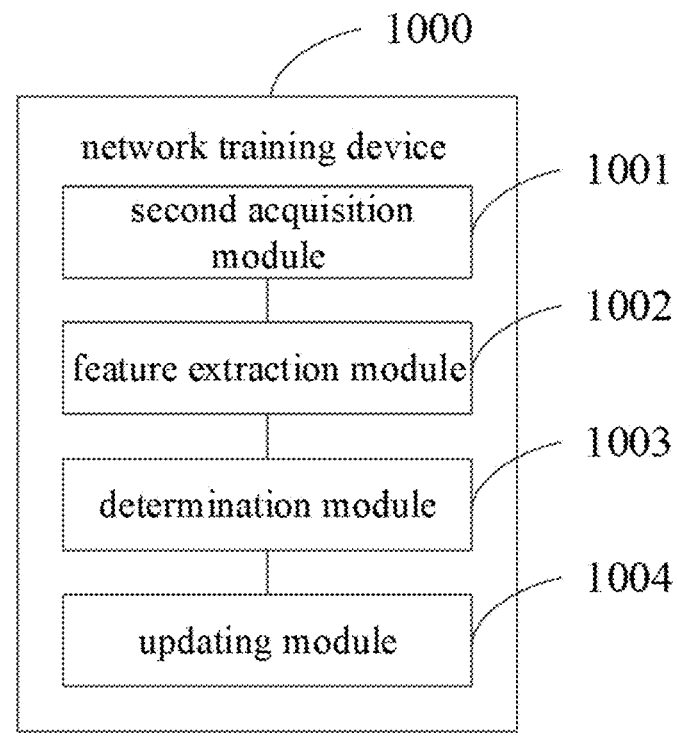
FIG. 10 is a schematic view showing a network training device according to a fourth embodiment of the present disclosure.

As shown in FIG. 10, the present disclosure provides in this embodiment a network training device 1000, which includes: a second acquisition module 1001 configured to acquire a training image set, the training image set including a training input satellite image and a training output satellite image corresponding to the training input satellite image, an image parameter of the training input satellite image being different from an image parameter of the training output satellite image, the image parameter including image transparency or an image quality parameter; a feature extraction module 1002 configured to perform feature extraction on the training input satellite image through a target neural network to acquire a first feature, fuse the first feature with a second feature to acquire a target feature, and perform image reconstruction in accordance with the target feature and the training input satellite image to acquire a second target satellite image, the second feature being a feature acquired through reconstructing a feature extracted from the first feature, the target neural network including a first neural network or a second neural network; a determination module 1003 configured to determine difference information between the second target satellite image and the training output satellite image; and an updating module 1004 configured to update a parameter of the target neural network in accordance with the difference information.

In a possible embodiment of the present disclosure, the target neural network may include the first neural network. The second acquisition module 100 may include: a first acquisition unit configured to acquire the training output satellite image; and a first generation unit configured to perform a fogging operation on the training output satellite image to generate the training input satellite image. Transparency of the training input satellite image may be lower than transparency of the training output satellite image.

In a possible embodiment of the present disclosure, the target neural network may include the second neural network. The second acquisition module 1001 may include: a second acquisition unit configured to acquire the training input satellite image, the training input satellite image being a satellite image outputted by the first neural network, the first neural network being used to perform a defogging operation on an inputted satellite image; and a second generation unit configured to adjust an image quality parameter of the training input satellite image to generate the training output satellite image.

In this embodiment of the present disclosure, the network training device 1000 may be used to implement the steps of the above-mentioned network training method with a same beneficial effect, which will not be particularly defined herein.

The present disclosure further provides in some embodiments an electronic device, a computer-readable storage medium and a computer program product.

Figure 11:
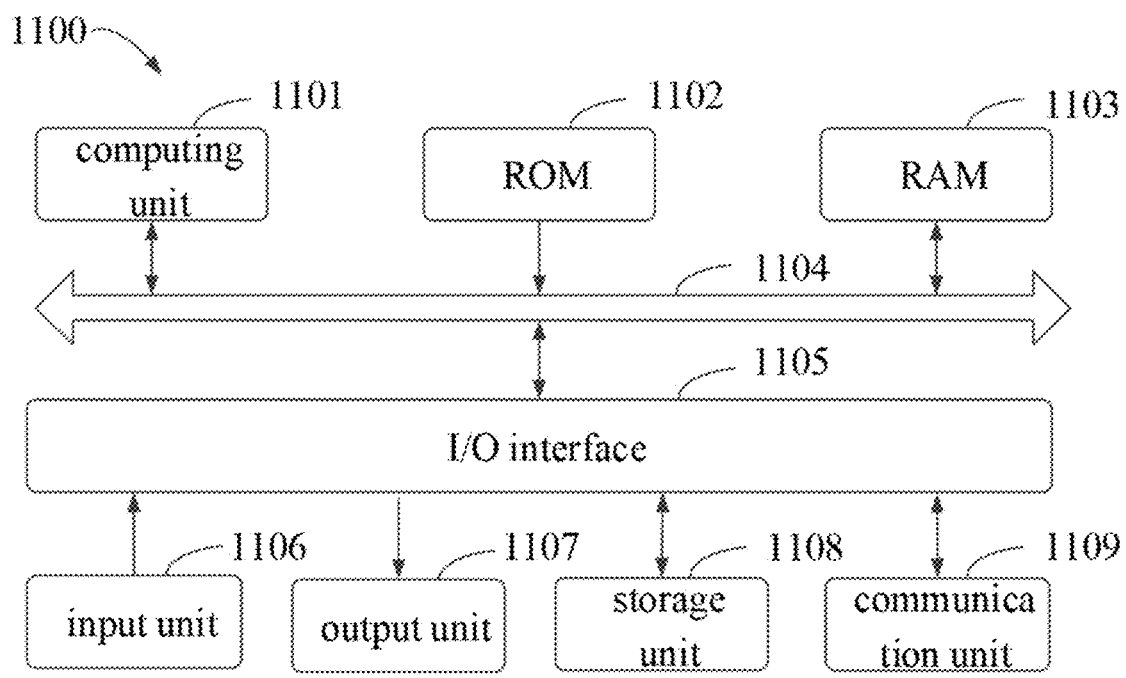
FIG. 11 is a block diagram of an electronic device 1100 for implementing the methods according to one embodiment of the present disclosure.

FIG. 11 is a schematic block diagram of an exemplary electronic device 1100 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 11, the electronic device 1100 includes a computing unit 1101 configured to execute various processings in accordance with computer programs stored in a Read Only Memory (ROM) 1102 or computer programs loaded into a Random Access Memory (RAM) 1103 via a storage unit 1108. Various programs and data desired for the operation of the electronic device 1100 may also be stored in the RAM 1103. The computing unit 1101, the ROM 1102 and the RAM 1103 may be connected to each other via a bus 1104. In addition, an input/output (I/O) interface 1105 may also be connected to the bus 1104.

Multiple components in the electronic device 1100 are connected to the I/O interface 1105. The multiple components include: an input unit 1106, e.g., a keyboard, a mouse and the like; an output unit 1107, e.g., a variety of displays, loudspeakers, and the like; a storage unit 1108, e.g., a magnetic disk, an optic disk and the like; and a communication unit 1109, e.g., a network card, a modem, a wireless transceiver, and the like. The communication unit 1109 allows the electronic device 1100 to exchange information/data with other devices through a computer network and/or other telecommunication networks, such as the Internet.

The computing unit 1101 may be any general purpose and/or special purpose processing components having a processing and computing capability. Some examples of the computing unit 1101 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 1101 carries out the aforementioned methods and processes, e.g., the satellite image processing method or the network training method. For example, in some embodiments of the present disclosure, the satellite image processing method or the network training method may be implemented as a computer software program tangibly embodied in a machine readable medium such as the storage unit 1108. In some embodiments of the present disclosure, all or a part of the computer program may be loaded and/or installed on the electronic device 1100 through the ROM 1102 and/or the communication unit 1109. When the computer program is loaded into the RAM 1103 and executed by the computing unit 1101, one or more steps of the foregoing satellite image processing method or the network training method may be implemented. Optionally, in some other embodiments of the present disclosure, the computing unit 1101 may be configured in any other suitable manner (e.g., by means of firmware) to implement the satellite image processing method or the network training method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN), the Internet and a blockchain network.

The computer system can include a client and a server. The client and server are generally remote from each other and typically interact through a communication network. The relationship of client and server arises by virtue of computer programs running on respective computers and having a client-server relationship to each other. The server may be a cloud server, also called as cloud computing server or cloud server, which is a host product in a cloud calculating service system, so as to overcome such defects as large management difficulty and insufficient service extensibility in a conventional physical host and a Virtual Private Server (VPS). The server may also be a server of a distributed system, or a server combined with blockchain.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A network training method, comprising:
    acquiring a training image set, the training image set comprising a training input satellite image and a training output satellite image corresponding to the training input satellite image, an image parameter of the training input satellite image being different from an image parameter of the training output satellite image, the image parameter comprising image transparency or an image quality parameter;
    performing feature extraction on the training input satellite image through a target neural network to acquire a first feature, fusing the first feature with a second feature to acquire a target feature, and performing image reconstruction in accordance with the target feature and the training input satellite image to acquire a second target satellite image, the second feature being a feature acquired through reconstructing a feature extracted from the first feature, the target neural network comprising a first neural network or a second neural network;
    determining difference information between the second target satellite image and the training output satellite image; and
    updating a parameter of the target neural network in accordance with the difference information.

2. The network training method according to claim 1, wherein the target neural network comprises the first neural network, wherein the acquiring the training image set comprises:
    acquiring the training output satellite image; and
    performing a fogging operation on the training output satellite image to generate the training input satellite image, wherein transparency of the training input satellite image is lower than transparency of the training output satellite image.

3. The network training method according to claim 1, wherein the target neural network comprises the second neural network, the acquiring the training image set comprise:
    acquiring the training input satellite image, the training input satellite image being a satellite image outputted by the first neural network, the first neural network being used to perform a defogging operation on an inputted satellite image; and
    adjusting an image quality parameter of the training input satellite image to generate the training output satellite image.

4. An electronic device, comprising:
    at least one processor; and
    a memory in communication with the at least one processor,
    wherein the memory is configured to store therein an instruction executed by the at least one processor, and the at least one processor is configured to execute the instruction so as to implement the network training method according to claim 1.

5. The electronic device according to claim 4, wherein the target neural network comprises the first neural network, wherein the acquiring the training image set comprises:
    acquiring the training output satellite image; and
    performing a fogging operation on the training output satellite image to generate the training input satellite image, wherein transparency of the training input satellite image is lower than transparency of the training output satellite image.

6. The electronic device according to claim 4, wherein the target neural network comprises the second neural network, the acquiring the training image set comprise:
    acquiring the training input satellite image, the training input satellite image being a satellite image outputted by the first neural network, the first neural network being used to perform a defogging operation on an inputted satellite image; and
    adjusting an image quality parameter of the training input satellite image to generate the training output satellite image.

7. A non-transitory computer-readable storage medium storing therein a computer instruction, wherein the computer instruction is executed by a computer so as to implement the network training method according to claim 1.

8. A satellite image processing method, comprising:
    acquiring a first target satellite image;
    defogging the first target satellite image through the first neural network trained by the method according to claim 1 to acquire a first satellite image; and
    adjusting an image quality parameter of the first satellite image through the second neural network trained by the method according to claim 1 to acquire a second satellite image.

9. The satellite image processing method according to claim 8, wherein the acquiring the first target satellite image comprises:
    concatenating a to-be-processed satellite image to at least one to-be-expanded satellite image to acquire the first target satellite image, wherein the at least one to-be-expanded satellite image is at least one satellite image overlapping an edge of the to-be-processed satellite image,
    wherein after the adjusting an image quality parameter of the first satellite image through a second neural network to acquire a second satellite image, the satellite image processing method further comprises:
    cropping a satellite image comprising a target region from the second satellite image to acquire a third satellite image corresponding to the target region, wherein the target region is a region corresponding to the to-be-processed satellite image.

10. An electronic device, comprising:
    at least one processor; and
    a memory in communication with the at least one processor, wherein the memory is configured to store therein an instruction executed by the at least one processor, and the at least one processor is configured to execute the instruction so as to implement the satellite image processing method according to claim 8.

11. A non-transitory computer-readable storage medium storing therein a computer instruction, wherein the computer instruction is executed by a computer so as to implement the satellite image processing method according to claim 8.

12. The electronic device according to claim 10, wherein the acquiring the first target satellite image comprises:
concatenating a to-be-processed satellite image to at least one to-be-expanded satellite image to acquire the first target satellite image, wherein the at least one to-be-expanded satellite image is at least one satellite image overlapping an edge of the to-be-processed satellite image,
wherein after the adjusting an image quality parameter of the first satellite image through a second neural network to acquire a second satellite image, the satellite image processing method further comprises:
cropping a satellite image comprising a target region from the second satellite image to acquire a third satellite image corresponding to the target region, wherein the target region is a region corresponding to the to-be-processed satellite image.

* * * * *